US008992372B2

(12) United States Patent
Mellet et al.

(10) Patent No.: US 8,992,372 B2
(45) Date of Patent: Mar. 31, 2015

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US); Andrew W. Phillips, Rochester, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 88 days.

(21) Appl. No.: 13/847,190

(22) Filed: Mar. 19, 2013

(65) Prior Publication Data

US 2013/0260947 A1 Oct. 3, 2013

Related U.S. Application Data

(60) Provisional application No. 61/618,975, filed on Apr. 2, 2012.

(51) Int. Cl.
*F16H 3/62* (2006.01)
*F16H 3/66* (2006.01)

(52) U.S. Cl.
CPC .. *F16H 3/62* (2013.01); *F16H 3/66* (2013.01); *F16H 2200/0069* (2013.01); *F16H 2200/0073* (2013.01); *F16H 2200/2012* (2013.01); *F16H 2200/2046* (2013.01)
USPC .......................................... 475/277; 475/279

(58) Field of Classification Search
USPC ......... 475/269, 271, 275, 277, 279, 282, 288, 475/290, 296, 330
See application file for complete search history.

(56) References Cited

U.S. PATENT DOCUMENTS

| | | | | |
|---|---|---|---|---|
| 7,651,431 B2* | 1/2010 | Phillips et al. | ................. | 475/282 |
| 7,691,022 B2* | 4/2010 | Phillips et al. | ................. | 475/275 |
| 7,887,454 B2* | 2/2011 | Phillips et al. | ................. | 475/275 |
| 7,914,414 B2* | 3/2011 | Phillips et al. | ................. | 475/276 |
| 8,007,395 B2* | 8/2011 | Wittkopp et al. | ............. | 475/275 |
| 8,052,566 B2* | 11/2011 | Wittkopp et al. | ............. | 475/275 |
| 8,052,567 B2* | 11/2011 | Hart et al. | ...................... | 475/282 |
| 8,057,349 B2* | 11/2011 | Phillips et al. | ................. | 475/275 |
| 2009/0118059 A1* | 5/2009 | Phillips et al. | ................. | 475/275 |
| 2010/0144486 A1* | 6/2010 | Hart et al. | ...................... | 475/275 |
| 2010/0210397 A1* | 8/2010 | Wittkopp et al. | ............. | 475/275 |

* cited by examiner

*Primary Examiner* — Derek D Knight
*Assistant Examiner* — David Morris

(57) ABSTRACT

A transmission has an input member, an output member, at least four planetary gear sets, a plurality of coupling members and a plurality of torque transmitting devices. Each of the planetary gear sets includes first, second and third members. The coupling members continuously interconnect a member of the first, second, third and fourth planetary gear sets with another member of the first, second, third and fourth planetary gear sets. The torque transmitting devices include clutches and brakes selectively engageable to interconnect at least one of the first, second and third members with at least one other of the first, second, third members and a stationary member and are actuatable in combinations of three to establish a plurality of forward gear ratios and one reverse gear ratio.

17 Claims, 2 Drawing Sheets

| GEAR STATE | GEAR RATIO | RATIO STEP | TORQUE TRANSMITTING ELEMENTS | | | | | |
|---|---|---|---|---|---|---|---|---|
| | | | 32 | 34 | 30 | 28 | 24 | 26 |
| REV | -3.830 | | | X | | | X | X |
| N | | -0.86 | | | | | | |
| 1ST | 4.450 | | | X | | X | X | |
| 2ND | 3.279 | 1.36 | | X | X | | X | |
| 3RD | 2.400 | 1.37 | X | X | | | X | |
| 4TH | 1.745 | 1.38 | X | | X | | X | |
| 5TH | 1.459 | 1.20 | X | | | X | X | |
| 6TH | 1.257 | 1.16 | X | | | | X | X |
| 7TH | 1.000 | 1.26 | | | | X | X | X |
| 8TH | 1.828 | 1.21 | | | X | | X | X |
| 9TH | 0.737 | 1.12 | | | | X | X | X |
| 10TH | 0.602 | 1.22 | X | | | X | | X |

X = ON - ENGAGED CARRYING TORQUE

FIG. 3

| GEAR STATE | GEAR RATIO | RATIO STEP | TORQUE TRANSMITTING ELEMENTS | | | | | |
|---|---|---|---|---|---|---|---|---|
| | | | 32 | 34 | 30 | 28 | 24 | 26 |
| REV | -3.830 | | | X | | | X | X |
| N | | -0.86 | | | | | | |
| 1ST | 4.450 | | | X | | X | X | |
| 2ND | 3.279 | 1.36 | | X | X | | X | |
| 3RD | 2.400 | 1.37 | X | X | | | X | |
| 4TH | 1.745 | 1.38 | X | | X | | X | |
| 5TH | 1.459 | 1.20 | X | | | X | X | |
| 6TH | 1.257 | 1.16 | X | | | | X | X |
| 7TH | 1.075 | 1.17 | X | | | X | X | |
| 8TH | 1.000 | 1.08 | | | | X | X | X |
| 9TH | 0.828 | 1.21 | | | X | | X | X |
| 10TH | 0.737 | 1.12 | | | | X | X | X |
| 11TH | 0.602 | 1.22 | X | | X | | | X |

X = ON - ENGAGED CARRYING TORQUE

FIG. 4

MULTI-SPEED TRANSMISSION

CROSS-REFERENCE TO RELATED APPLICATION

This application claims the benefit of U.S. Provisional Application No. 61/618,975 filed Apr. 2, 2012. The disclosure of the above application is incorporated herein by reference.

FIELD

The invention relates generally to a multiple speed transmission, and more particularly, to a transmission having a plurality speeds, planetary gear sets and torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, at least four planetary gear sets, a plurality of coupling members and a plurality of torque transmitting devices. Each of the planetary gear sets includes first, second and third members. The torque transmitting devices may be, for example, clutches and brakes.

In another aspect of the present invention, the first, second, third and fourth planetary gear sets each having a sun gear, a carrier member and a ring gear.

In still another aspect of the present invention, the input member is continuously connected for common rotation with the carrier member of the fourth planetary gear set.

In still another aspect of the present invention, the output member is continuously connected for common rotation with the carrier member of the third planetary gear set and the ring gear of the first planetary gear set.

In still another aspect of the present invention, the carrier member of the first planetary gear set is configured to support a first and a second set of pinions.

In still another aspect of the present invention, the first set of pinions mesh with both the sun gear of the first planetary gear set and the second set of pinions and the second set of pinions mesh with both the ring gear of the first planetary gear set and the first set of pinions.

In yet another aspect of the present invention, a first interconnecting member continuously interconnects the ring gear of the first planetary gear set with the carrier member of the third planetary gear set.

In yet another aspect of the present invention, a second interconnecting member continuously interconnects the carrier member of the first planetary gear set with the carrier member of the second planetary gear set.

In yet another aspect of the present invention, a third interconnecting member continuously interconnects the ring gear of the second planetary gear set with the ring gear of the third planetary gear set.

In yet another aspect of the present invention, a fourth interconnecting member continuously interconnects the sun gear of the third planetary gear set with the ring gear of the fourth planetary gear set.

In yet another aspect of the present invention, a first torque transmitting mechanism is selectively engageable to interconnect the sun gear of the first planetary gear set with the carrier member of the fourth planetary gear set and the input member.

In yet another aspect of the present invention, a second torque transmitting mechanism is selectively engageable to interconnect the carrier member of the first planetary gear set and the carrier member of the second planetary gear set with the sun gear of the third planetary gear set and the ring gear of the fourth planetary gear set.

In yet another aspect of the present invention, a third torque transmitting mechanism is selectively engageable to interconnect the sun gear of the first planetary gear set with the sun gear of the third planetary gear set and the ring gear of the fourth planetary gear set.

In yet another aspect of the present invention, a fourth torque transmitting mechanism is selectively engageable to interconnect the sun gear of the fourth planetary gear set with the stationary member.

In yet another aspect of the present invention, a fifth torque transmitting mechanism is selectively engageable to interconnect the sun gear of the second planetary gear set with the stationary member.

In yet another aspect of the present invention, a sixth torque transmitting mechanism is selectively engageable to interconnect the ring gear of the second planetary gear set and the ring gear of the third planetary gear set with the stationary member.

In yet another aspect of the present invention, the torque transmitting mechanisms are selectively engageable in combinations of at least three to establish a plurality of forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 1:
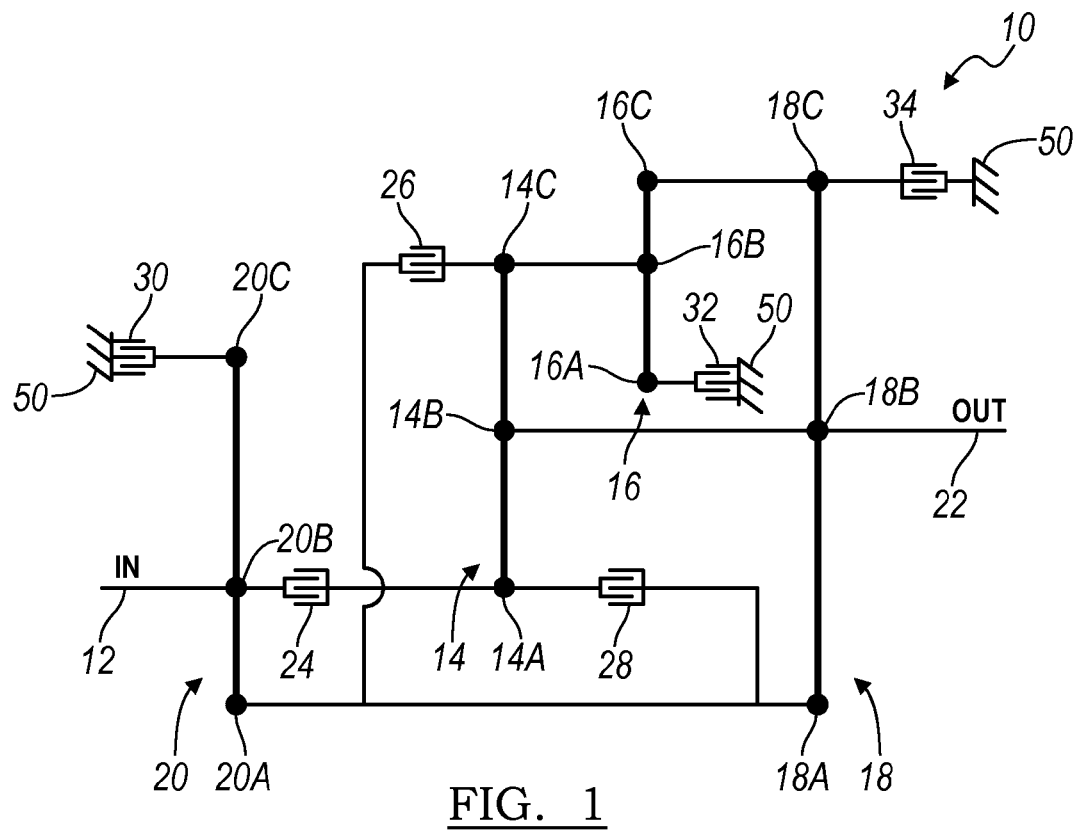
FIG. 1 is a lever diagram of an embodiment of a transmission according to the principles of present invention.
Figure 2:
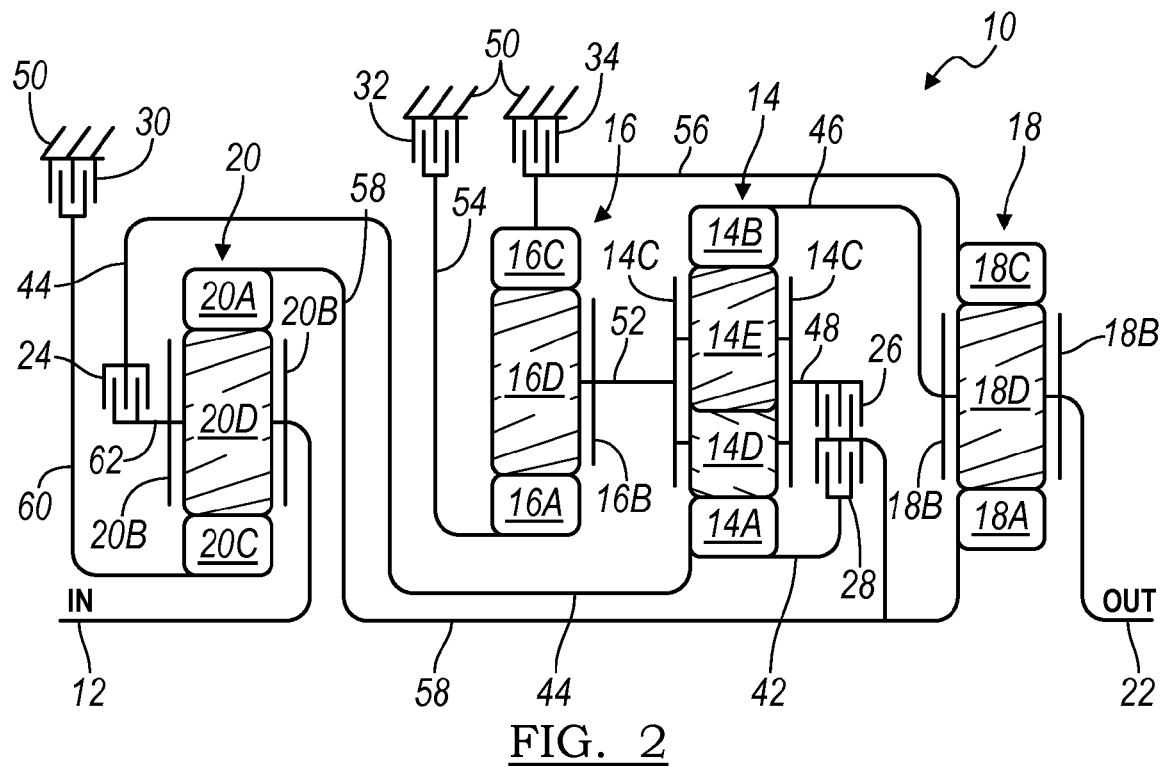
FIG. 2 is a diagrammatic illustration of a variation of the transmission of FIG. 1 according to the principles of the present invention.

FIG. 3 is a truth table presenting an example of a state of engagement of various torque transmitting elements to produce ten forward and one reverse speed or gear ratios of the transmissions illustrated in FIGS. 1-2; and FIG. 4 is a truth table presenting an example of a state of engagement of various torque transmitting elements to produce eleven forward and one reverse speed or gear ratios of the transmissions illustrated in FIGS. 1-2.

DETAILED DESCRIPTION

The following description is merely exemplary in nature and is not intended to limit the present disclosure, application, or uses.

In some forms of the present disclosure, a ten or eleven speed transmission is provided in a relatively small package by achieving ten or eleven forward speeds with four planetary gear sets, three brakes, and three clutches. In other variations, however, additional brakes, clutches, planetary gear sets, or other components may be added.

At the outset, it should be appreciated that the embodiments of the ten or eleven speed automatic transmissions of the present invention have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In one embodiment, a second component or element of a first planetary gear set is permanently coupled to a second component or element of a third planetary gear set. A third component or element of the first planetary gear set is permanently coupled to a second component or element of a second planetary gear set. A third component or element of the second planetary gear set is permanently coupled to a third component or element of a third planetary gear set. A first component or element of the third planetary gear set is permanently coupled to a first component or element of the fourth planetary gear set.

Referring now to FIG. 1, an embodiment of a ten or eleven speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the second node 20B of the fourth planetary gear set 20. The output member 22 is continuously coupled to the second node 18B of the third planetary gear set 18 and the second node 14B of the first planetary gear set 14.

The second node 14B of the first planetary gear set 14 is coupled to the second node 18B of the third planetary gear set 18. The third node 14C of the first planetary gear set 14 is coupled to the second node 16B of the second planetary gear set 16. The third node 16C of the second planetary gear set 16 is coupled to the third node 18C of the third planetary gear set 18. The first node 18A of the third planetary gear set 18 is coupled to the first node 20A of the fourth planetary gear set 20.

A first clutch 24 selectively connects the input member or shaft 12 and the second node 20B of the fourth planetary gear set 20 with the first node 14A of the first planetary gear set 14. A second clutch 26 selectively connects the third node 14C of the first planetary gear set 14 and the second node 16B of the second planetary gear set 16 with the first node 20A of the fourth planetary gear set 20 and the first node 18A of the third planetary gear set 18. A third clutch 28 selectively connects the first node 14A of the first planetary gear set 14 with the first node 20A of the fourth planetary gear set 20 and the first node 18A of the third planetary gear set 18.

A first brake 30 selectively connects the third node 20C of the fourth planetary gear set 20 with a stationary member or transmission housing 50. A second brake 32 selectively connects the first node 16A of the second planetary gear set 16 with the stationary member or transmission housing 50. A third brake 34 selectively connects the third node 16C of the second planetary gear set 16 and the third node 18C of the third planetary gear set 18 with the stationary member or transmission housing 50.

Referring now to FIG. 2, a stick diagram presents a schematic layout of an embodiment of the ten or eleven speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a ring gear member 14B, and a planet gear carrier member 14C that rotatably supports a first set of planet gears 14D (only one of which is shown) and a second set of planet gears 14E (only one of which is shown). The sun gear member 14A is connected for common rotation with a first shaft or interconnecting member 42 and a second shaft or interconnecting member 44. The ring gear member 14B is connected for common rotation with a third shaft or interconnecting member 46. The planet carrier member 14C is connected for common rotation with a fourth shaft or interconnecting member 48 and a fifth shaft or interconnecting member 52. The first set of planet gears 14D are each configured to intermesh with both the sun gear member 14A and the second set of planet gears 14E. The second set of planet gears 14E are each configured to intermesh with both the ring gear member 14B and the first set of planet gears 14D.

The second planetary gear set 16 includes a sun gear member 16A, a ring gear member 16C, and a planet gear carrier member 16B that rotatably supports a second set of planetary gears 16D (only one of each is shown). The sun gear member 16A is connected for common rotation with the sixth shaft or interconnecting member 54. The planet carrier member 16B is connected for common rotation with the fifth shaft or interconnecting member 52. The ring gear member 16C is connected for common rotation with a seventh shaft or interconnecting member 56. The planet gears 16D are each configured to intermesh with both the ring gear member 16C and the sun gear member 16A.

The third planetary gear set 18 includes a sun gear member 18A, a ring gear member 18C, and a planet gear carrier member 18B that rotatably supports a set of planet gears 18D (only one of which is shown). The sun gear member 18A is connected for common rotation with an eighth shaft or interconnecting member 58. The planet carrier member 18B is connected for common rotation with the third shaft or interconnecting member 46 and the output shaft or member 22. The ring gear member 18C is connected for common rotation with the seventh shaft or interconnecting member 56. The planet gears 18D are each configured to intermesh with both the sun gear member 18A and the ring gear member 18C.

The fourth planetary gear set 20 includes a sun gear member 20C, a ring gear member 20A and a planet gear carrier member 20B that rotatably supports a set of planet gears 20D (only one of which is shown). The sun gear member 20C is connected for common rotation with a ninth shaft or interconnecting member 60. The ring gear member 20A is connected for common rotation with the eighth shaft or interconnecting member 58. The planetary gear carrier member 20B is connected for common rotation with the input shaft or member 12 and a tenth shaft or interconnecting member 62. The planet gears 20D are each configured to intermesh with both the sun gear member 20C and the ring gear member 20A.

The input shaft or member 12 is continuously connected to an input source, such as an engine (not shown) or a turbine of a torque converter (not shown). The output shaft or member 22 is continuously connected with another output such as the final drive unit or transfer case (not shown).

The torque-transmitting mechanisms, including the first, second, and third clutches 24, 26, 28 and the first, second and third brakes 30, 32 and 34 allow for selective interconnection of the shafts or interconnecting members 42, 44, 46, 48, 52, 54, 56, 58, 60, 62 of the planetary gear sets 14, 16, 18, 20 and the housing 50.

For example, the first clutch 24 is selectively engageable to connect the second shaft or interconnecting member 44 with the tenth shaft or interconnecting member 62. The second clutch 26 is selectively engageable to connect the fourth shaft or interconnecting member 48 with the eighth shaft or interconnecting member 58. The third clutch 28 is selectively engageable to connect the first shaft or interconnecting member 42 with the eighth shaft or interconnecting member 58.

The first brake 30 is selectively engageable to connect the ninth shaft or interconnecting member 60 with the stationary element or the transmission housing 50 in order to restrict the member 60 from rotating relative to the transmission housing 50. The second brake 32 is selectively engageable to connect the sixth shaft or interconnecting member 54 with the stationary element or the transmission housing 50 in order to restrict the member 54 from rotating relative to the transmission housing 50. The third brake 34 is selectively engageable to connect the seventh shaft or interconnecting member 56 with the stationary element or the transmission housing 50 in order to restrict the member 56 from rotating relative to the transmission housing 50. In turn, the gear elements connected to each of the connecting members are also connected or restricted accordingly.

Referring now to FIG. 2 and FIG. 3, the operation of the ten speed transmission 10 embodiment will be described. It will be appreciated that transmission 10 is capable of transmitting torque from the input shaft or member 12 to the output shaft or member 22 in ten, eleven or more forward speed torque ratios and at least one reverse speed or torque ratio. Each forward and reverse speed or torque ratio is attained by engagement of one or more of the torque-transmitting mechanisms (i.e. first clutch 24, second clutch 26, third clutch 28, first brake 30, second brake 32 and third brake 34), as will be explained below.

FIG. 3 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, the first clutch 24, the second clutch 26 and the third brake 34 are engaged or activated. The first clutch 24 connects the second shaft or interconnecting member 44 with the tenth shaft or interconnecting member 62. The second clutch 26 connects the fourth shaft or interconnecting member 48 with the eighth shaft or interconnecting member 58. The third brake 34 connects the seventh shaft or interconnecting member 56 with the stationary element or the transmission housing 50 in order to restrict the member 56 from rotating relative to the transmission housing 50, which restricts the ring gear member 18C and the ring gear member 16C from rotating relative to the transmission housing 50. Likewise, ten forward ratios are achieved through different combinations of clutch and brake engagement, as shown in FIG. 3, by way of example.

Referring now to FIG. 4, a truth table is presented illustrating the various combinations of torque-transmitting mechanisms that are activated or engaged to achieve eleven speeds with transmission 10 of FIG. 2. The present embodiment adds one more forward speed as compared to the ten speed transmission illustrated in the truth table of FIG. 3. As shown in FIG. 4, the additional forward gear ratio is established by adding a different torque-transmitting mechanism engagement sequence for the $7^{th}$ gear ratio. The $8^{th}$, $9^{th}$, $10^{th}$ and $11^{th}$ gear ratios have the same torque-transmitting mechanism engaged as the $7^{th}$, $8^{th}$, $9^{th}$ and $10^{th}$ gear ratios of the ten speed transmission shown in FIG. 3, respectively. For example, the $7^{th}$ gear ratio is established by engaging the third clutch 28, the first brake 30 and the second brake 32. The third clutch 28 connects the first shaft or interconnecting member 42 with the eighth shaft or interconnecting member 58. The first brake 30 connects the ninth shaft or interconnecting member 60 with the stationary element or the transmission housing 50 in order to restrict the member 60 from rotating relative to the transmission housing 50. The second brake 32 connects the sixth shaft or interconnecting member 54 with the stationary element or the transmission housing 50 in order to restrict the member 54 from rotating relative to the transmission housing

50. Likewise, the ten other forward ratios are achieved through different combinations of clutch and brake engagement, as shown in FIG. 4.

It will be appreciated that the foregoing explanation of operation and gear states of the ten and eleven speed embodiments of transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
    an input member;
    an output member;
    first, second, third and fourth planetary gear sets each having first, second and third members, and wherein the output member is continuously connected for common rotation with the second member of the third planetary gear set and the second member of the first planetary gear set;
    a plurality of interconnecting members each continuously interconnecting one of the first, second, and third members of the first, second, third and fourth planetary gear sets with another of the first, second, and third members of the first, second, third and fourth planetary gear sets; and
    at least six torque transmitting mechanisms wherein at least three of the at least six torque transmitting mechanisms are each selectively engageable to interconnect at least one of the first, second and third members of the first, second, third and fourth planetary gear sets with at least one other of the first, second, third members of the first, second, third and fourth planetary gear sets and wherein three of the at least six torque transmitting mechanisms are each selectively engageable to interconnect at least one of the first, second and third members of the first, second, third and fourth planetary gear sets with a stationary member, and
    wherein the at least six torque transmitting mechanisms are selectively engageable in combinations of at least three to establish a plurality of forward speed ratios and at least one reverse speed ratio between the input member and the output member, a first of the at least six torque transmitting mechanisms is selectively engageable to interconnect the first member of the first planetary gear set with the second member of the fourth planetary gear set and the input member, a second of the at least six torque transmitting mechanisms is selectively engageable to interconnect the third member of the first planetary gear set and the second member of the second planetary gear set with the first member of the third planetary gear set and the first member of the fourth planetary gear set, and a third of the at least six torque transmitting mechanisms is selectively engageable to interconnect the first member of the first planetary gear set with the first member of the third planetary gear set and the first member of the fourth planetary gear set.

2. The transmission of claim 1 wherein the plurality of interconnecting members further comprises a first interconnecting member continuously interconnecting the second member of the first planetary gear set with the second member of the third planetary gear set, a second interconnecting member continuously interconnecting the third member of the first planetary gear set with the second member of the second planetary gear set, a third interconnecting member continuously interconnecting the third member of the second planetary gear set with the third member of the third planetary gear set and a fourth interconnecting member continuously interconnecting the first member of the third planetary gear set with the first member of the fourth planetary gear set.

3. The transmission of claim 1 wherein a fourth of the at least six torque transmitting mechanisms is selectively engageable to interconnect the third member of the fourth planetary gear set with the stationary member.

4. The transmission of claim 3 wherein a fifth of the at least six torque transmitting mechanisms is selectively engageable to interconnect the first member of the second planetary gear set with the stationary member.

5. The transmission of claim 4 wherein a sixth of the at least six torque transmitting mechanisms is selectively engageable to interconnect the third member of the second planetary gear set and the third member of the third planetary gear set with the stationary member.

6. The transmission of claim 1 wherein the input member is continuously connected for common rotation with the second member of the fourth planetary gear set.

7. The transmission of claim 1 wherein the first member of the first planetary gear set, the first member of the second planetary gear set, the first member of the third planetary gear set and the third member of the fourth planetary gear set are sun gears, the second members of the second, third and fourth planetary gear sets and the third member of the first planetary gear set are carrier members and the second member of the first planetary gear set, the third member of the second planetary gear set, the third member of the third planetary gear set and the third member of the fourth planetary gear set are ring gears, and wherein the carrier member of the first planetary gear set is configured to support a first and a second set of pinions, wherein the first set of pinions mesh with both the sun gear of the first planetary gear set and the second set of pinions and the second set of pinions mesh with both the ring gear of the first planetary gear set and the first set of pinions.

8. A transmission comprising:
    an input member;
    an output member;
    first, second, third and fourth planetary gear sets each having first, second and third members, and wherein the output member is continuously connected for common rotation with the second member of the third planetary gear set and the second member of the first planetary gear set;
    a first interconnecting member continuously interconnecting the second member of the first planetary gear set with the second member of the third planetary gear set;
    a second interconnecting member continuously interconnecting the third member of the first planetary gear set with the second member of the second planetary gear set;
    a third interconnecting member continuously interconnecting the third member of the second planetary gear set with the third member of the third planetary gear set;
    a fourth interconnecting member continuously interconnecting the first member of the third planetary gear set with the first member of the fourth planetary gear set; and
    at least six torque transmitting mechanisms wherein at least three of the at least six torque transmitting mechanisms are each selectively engageable to interconnect at least one of the first, second and third members of the first, second, third and fourth planetary gear sets with at least one other of the first, second, third members of the first, second, third and fourth planetary gear sets and wherein three of the at least six torque transmitting mechanisms are each selectively engageable to interconnect at least one of the first, second and third members of the first, second, third and fourth planetary gear sets with a stationary member, and wherein the six torque transmitting mechanisms are selectively engageable in combinations of at least three to establish at least ten forward speed ratios and at least one reverse speed ratio between the input member and the output member.

9. The transmission of claim 8 wherein a first of the six torque transmitting mechanisms is selectively engageable to interconnect the first member of the first planetary gear set with the second member of the fourth planetary gear set and the input member.

10. The transmission of claim 9 wherein a second of the six torque transmitting mechanisms is selectively engageable to interconnect the third member of the first planetary gear set and the second member of the second planetary gear set with the first member of the third planetary gear set and the first member of the fourth planetary gear set.

11. The transmission of claim 10 a third of the six torque transmitting mechanisms is selectively engageable to interconnect the first member of the first planetary gear set with the first member of the third planetary gear set and the first member of the fourth planetary gear set.

12. The transmission of claim 11 wherein a fourth of the six torque transmitting mechanisms is selectively engageable to interconnect the third member of the fourth planetary gear set with the stationary member.

13. The transmission of claim 12 wherein a fifth of the six torque transmitting mechanisms is selectively engageable to interconnect the first member of the second planetary gear set with the stationary member.

14. The transmission of claim 13 wherein a sixth of the six torque transmitting mechanisms is selectively engageable to interconnect the third member of the second planetary gear set and the third member of the third planetary gear set with the stationary member.

15. The transmission of claim 8 wherein the output member is continuously connected for common rotation with the second member of the third planetary gear set and the second member of the first planetary gear set.

16. The transmission of claim 8 wherein the first member of the first planetary gear set, the first member of the second planetary gear set, the first member of the third planetary gear set and the third member of the fourth planetary gear set are sun gears, the second members of the second, third and fourth planetary gear sets and the third member of the first planetary gear set are carrier members and the second member of the first planetary gear set, the third member of the second planetary gear set, the third member of the third planetary gear set and the third member of the fourth planetary gear set are ring gears, and wherein the carrier member of the first planetary gear set is configured to support a first and a second set of pinions, wherein the first set of pinions mesh with both the sun gear of the first planetary gear set and the second set of pinions and the second set of pinions mesh with both the ring gear of the first planetary gear set and the first set of pinions.

17. A transmission comprising:
an input member;
an output member;
first, second, third and fourth planetary gear sets each having a sun gear, a carrier member and a ring gear, wherein the input member is continuously connected for common rotation with the carrier member of the fourth planetary gear set, and wherein the output member is continuously connected for common rotation with the carrier member of the third planetary gear set and the ring gear of the first planetary gear set and wherein the carrier member of the first planetary gear set is configured to support a first and a second set of pinions, wherein the first set of pinions mesh with both the sun gear of the first planetary gear set and the second set of pinions and the second set of pinions mesh with both the ring gear of the first planetary gear set and the first set of pinions;
a first interconnecting member continuously interconnecting the ring gear of the first planetary gear set with the carrier member of the third planetary gear set;
a second interconnecting member continuously interconnecting the carrier member of the first planetary gear set with the carrier member of the second planetary gear set;
a third interconnecting member continuously interconnecting the ring gear of the second planetary gear set with the ring gear of the third planetary gear set;
a fourth interconnecting member continuously interconnecting the sun gear of the third planetary gear set with the ring gear of the fourth planetary gear set;
a first torque transmitting mechanism selectively engageable to interconnect the sun gear of the first planetary gear set with the carrier member of the fourth planetary gear set and the input member;
a second torque transmitting mechanism selectively engageable to interconnect the carrier member of the first planetary gear set and the carrier member of the second planetary gear set with the sun gear of the third planetary gear set and the ring gear of the fourth planetary gear set;
a third torque transmitting mechanism selectively engageable to interconnect the sun gear of the first planetary gear set with the sun gear of the third planetary gear set and the ring gear of the fourth planetary gear set;
a fourth torque transmitting mechanism selectively engageable to interconnect the sun gear of the fourth planetary gear set with a stationary member;
a fifth torque transmitting mechanism selectively engageable to interconnect the sun gear of the second planetary gear set with the stationary member;
a sixth torque transmitting mechanism selectively engageable to interconnect the ring gear of the second planetary gear set and the ring gear of the third planetary gear set with the stationary member, and
wherein the torque transmitting mechanisms are selectively engageable in combinations of at least three to establish a plurality of forward speed ratios and at least one reverse speed ratio between the input member and the output member.

* * * * *